United States Patent [19]
Pon

[11] Patent Number: 5,771,456
[45] Date of Patent: Jun. 23, 1998

[54] ENHANCED SUPPRESSION OF MULTIPATH INTERFERENCE

[75] Inventor: Rayman Pon, Cupertino, Calif.

[73] Assignee: Trimble Navigation Limited, Sunnyvale, Calif.

[21] Appl. No.: 694,845

[22] Filed: Aug. 9, 1996

[51] Int. Cl.⁶ ..................................................... H04Q 7/20
[52] U.S. Cl. ............................ 455/456; 455/506; 455/65
[58] Field of Search .................................... 455/456, 457, 455/504, 505, 506, 65, 63; 340/988, 989, 993; 342/386–391, 421, 450, 461, 357, 352; 364/443, 449.1, 449.7, 449.8, 451, 452

[56] References Cited

U.S. PATENT DOCUMENTS

| 4,369,444 | 1/1983 | Blumling . | |
|---|---|---|---|
| 4,485,384 | 11/1984 | Connor . | |
| 5,347,286 | 9/1994 | Babitch | 342/359 |
| 5,379,449 | 1/1995 | Porambo . | |
| 5,396,540 | 3/1995 | Gooch | 455/456 |
| 5,437,055 | 7/1995 | Wheatley . | |
| 5,450,448 | 9/1995 | Sheynblat | 375/346 |

Primary Examiner—Nguyen Vo
Attorney, Agent, or Firm—John Schipper

[57] ABSTRACT

A method for suppressing the effects of multipath signals in determination of the location of a mobile user, using the speed or magnitude of the velocity v of the user to determine the procedure(s) to be used to determine the range or pseudorange values corresponding to the GPS, GLONASS, LORAN, FM subcarrier or other location determination (LD) signals received from a plurality of LD signal sources. Where the user velocity v satisfies $v \leq v1$, or $v \geq v2$ (v1 and v2 being two selected velocity threshold values with $0 < v1 < v2$), the range or pseudorange values are determined by a first procedure and by a second procedure, respectively, that reduce or eliminate the effects of multipath signals. Where the user velocity v satisfies $v1 < v < v2$, the range or pseudorange values are determined by a blend of the first and second procedures.

19 Claims, 3 Drawing Sheets

ENHANCED SUPPRESSION OF MULTIPATH INTERFERENCE

FIELD OF THE INVENTION

This invention relates to suppression of multipath interference with receipt of transmitted signals, using information on receiver velocity.

BACKGROUND OF THE INVENTION

Any signal received by over-the-air transmission is likely to include a multipath contribution, a distorted version of the originally transmitted signal that has traveled a different path than the "direct" signal. Often, although not always, a multipath signal arises through reflection of the direct signal from a reflecting surface; in such instances, the multipath signal arrives at the receiver after the direct signal arrives. Presence of a multipath signal can shift or mask, and thus corrupt, the time of arrival of the direct signal. Where time of arrival of the direct signal is important, as in location and/or time determination using GPS, GLONASS , LORAN-C or FM subcarrier signals, referred to as location determination (LD) signals here, suppression or removal of the multipath contribution in a received signal is important.

Most approaches to multipath suppression appear to assume that the signal receiver is fixed, or nearly so. A few workers in multipath control have noted some effects that appear when the receiver is in motion. Blumling, in U.S. Pat. No. 4,369,444, discloses a Doppler shift speed measurement system that uses radar to measure the vertical component of target velocity. Differences in Doppler shift between the direct return signal and the multipath return signal are formed, and the difference signals are filtered and processed to estimate the target's vertical speed. This approach appears to require temporal separability of the direct and return signals.

U.S. Pat. No. 4,485,384, issued to Connor, discloses a double sideband Doppler microwave system for providing angular information on a landing aircraft. Two reference radiators and a source that moves along a baseline between these two reference radiators are used to control residual multipath signals present in the Doppler return signal.

An automatic antenna pointing system, using two spaced apart antennas and based on global positioning system attitude information, is disclosed in U.S. Pat. No. 5,347,286, issued to Babitch. A servomechanism moves the two antennas in a circle to average out multipath effects. This approach requires that the two antennas be moved in a closed path.

Porambo discloses a radio receiver system that automatically takes corrective action when multipath distortion is detected, in U.S. Pat. No. 5,379,449. The receiver and two or more antennas are carried in a moving vehicle, and the number of multipath events and their respective durations are found to vary with vehicle speed. Antenna switching is suspended at relatively high speeds and antenna filtering is suspended at relatively low vehicle speeds.

A diversity antenna system for multipath interference control indoors is disclosed in U.S. Pat. No. 5,437,055, issued to Wheatley. Actual or perceived motion of an antenna is provided so that the effects of signal fading or multipath interference are averaged over a selected time interval.

What is needed is an approach that allows suppression or elimination of multipath contributions in a composite signal received in an over-the-air transmission, where the composite signal receiver is moving at an arbitrary velocity. Preferably, the approach should be usable whether the signal receiver is stationary or is in motion, although the effectiveness of the approach may vary with the receiver velocity.

SUMMARY OF THE INVENTION

These needs are met by the invention, which utilizes some qualitative effects that non-zero receiver velocity has on multipath signals that arrive at that receiver. The contribution of an incident multipath signal is often found to decrease as the magnitude of receiver velocity increases, although the rate of such decrease may vary with the direction of movement of the receiver. FIG. 1 qualitatively illustrates an effect of non-zero signal receiver velocity v on multipath signal interference, where one or more multipath signals are present: the multipath interference effects often tend monotonically toward zero as v increases.

In one embodiment of the invention, a vehicle carries an LD signal antenna and LD signal receiver/processor that receive and process signals from a plurality of LD signal sources and that determine the location and velocity of the antenna. When the magnitude v of the antenna velocity is no greater than a first (low) velocity threshold v1, a first multipath suppression procedure, applicable to stationary and very low speed LD signal receivers, is applied to suppress or eliminate the effects of multipath signals and to determine antenna location. When the magnitude v of the antenna velocity is at least equal to a second (high) velocity threshold v2(>v1), a second multipath suppression procedure is applied to suppress or eliminate the effects of multipath signals and to determine antenna location. Where the magnitude v of the antenna velocity satisfies v1<v<v2, a blend or mixture of the antenna location, determined by combining the first multipath suppression procedure and the second multipath suppression procedure, is formed and used as the location of the LD antenna on the moving vehicle. When the antenna speed or velocity magnitude v increases from below v=v1 to above v=v2, the system follows one path for signal processing. When the antenna speed v decreases from above v=v2 to below v=v1, the system follows a second path that may be the same as, or different from, the first path. This approach uses a single antenna carried on a moving vehicle, although two or more antennas can be used.

DESCRIPTION OF BEST MODES OF THE INVENTION

Figure 2:
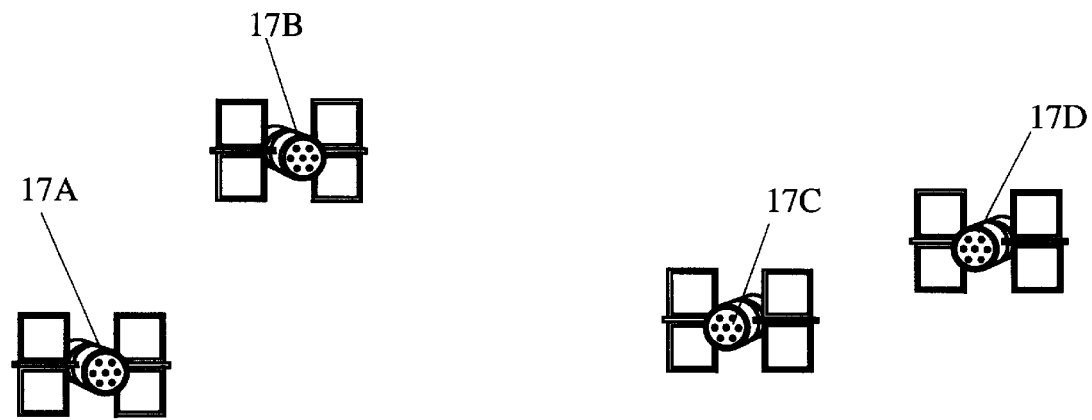
FIG. 2 is a schematic view illustrating use of the invention in one environment.
Figure 2:
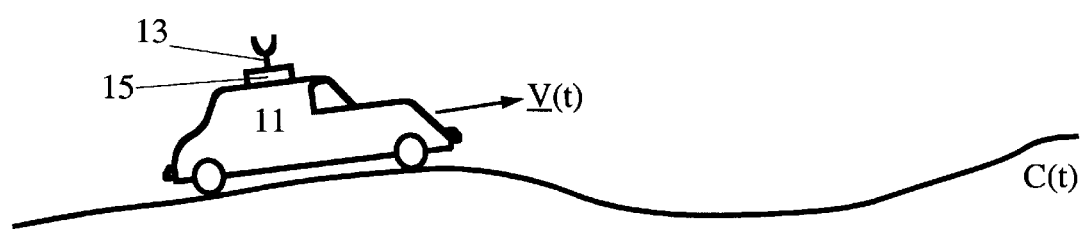

FIG. 2 illustrates an environment in which the invention can be used. A vehicle or other mobile carrier 11 carries an LD signal antenna 13 and an associated LD signal receiver/processor 15 that receive and process signals transmitted from three or more LD signal sources 17A, 17B, 17C, 17D. At any moment in time t shown in FIG. 2, the LD antenna 13 has a location vector L(t) with location coordinates (x(t), y(t), z(t)) and has a velocity vector v(t) with velocity coordinates (vx(t), vy(t), vz(t)) and magnitude $|v(t)|=v(t)=[v_x(t)^2+v_y(t)^2+v_z(t)^2]^{1/2}$. The LD signals may be received and processed as part of a Global Positioning System (GPS), a Global Orbiting Navigational Satellite System (GLONASS), a LORAN system, a TACAN system, an OMEGA system, a DECCA system, a JTIDS Relnav system, a PLRS, an FM subcarrier system, or any other suitable location determination system. The LD signals are assumed to be sampled and processed at a rate of r times per second, where r may be greater than 1 or less than or equal to 1 and need not be an integer. For a Global Positioning System (GPS), the sampling rate is presently about 1.67 Hz in one approach.

An LD signal, received at an antenna 13 that is moving with speed v(t), from an LD signal source may be a composite signal $S_c(t;v)$ that includes the "direct" signal $S_d(t;v)$, received directly from the LD signal source, and one or more multipath signal contributions $S_m(t;v)$, each of which has been reflected from one or more objects before receipt of this signal at the LD antenna. The LD receiver/processor 15 requires receipt of LD signals from a particular LD signal source (j) for at least a time interval of length $\Delta t_{fix}$ in order to determine the corresponding pseudorange between LD signal source j and the antenna 13. Usually, $\Delta t_{fix}$ is at least equal to 1/r.

If the vehicle 11, and hence the antenna 13, is moving with a velocity vector v(t) during the pseudorange fix time interval for that LD signal source, the antenna 13 location will be displaced by coordinate increments $(\Delta x(t0;\Delta t_{fix}), \Delta y(t0;\Delta t_{fix}), \Delta z(t0;\Delta t_{fix}))$ in three location coordinate directions, where $$\Delta x(t0;\Delta t_{fix})_s = \int_{t0}^{t} v_x(t')dt', \quad (1)$$

$$\Delta y(t0;\Delta t_{fix})_s = \int_{t0}^{t} v_y(t')dt', \quad (2)$$

$$\Delta z(t0;\Delta t_{fix})_s = \int_{t0}^{t} v_z(t')dt'. \quad (3)$$

For low speeds v, $0 \leq v \leq v1$, where v1 is a first selected speed threshold that is preferably no more than 1–5 meters/sec, the LD receiver/processor 15 responds as if the antenna 13 is substantially stationary, and a multipath signal processing approach that is suitable for antenna speed v=0 will suffice here.

One suitable low-velocity technique is described in U.S. Pat. No. 5,450,448, entitled "Removal of Signal Errors from Differential Satellite Positioning Systems" and issued to Sheynblat, incorporated by reference herein. In the Sheynblat approach, for times t greater than a selected time t0, a first difference signal $$\Delta PR_{ij}(t;t0) = \Delta PR_{ij}(t) - PR_{ij}(t0) \quad (4)$$

for the pseudorange values is formed, measured by receiver i and received from satellite j, and a second difference signal $$\Delta \Phi_{ij}(t;t0) = \Phi_{ij}(t) - \Phi_{ij}(t0) \quad (5)$$

for the carrier phase values is formed, measured by receiver i and received from satellite j. A third difference signal $$DD_{ij}(t;t0) = \Delta PR_{ij}(t;t0) - \Delta \Phi_{ij}(t;t0), \quad (6)$$

containing primarily multipath errors and clock errors, is then formed and passed through several groupings of statistical processing filters (SPFs) that employ different time constants, as shown in FIG. 2 of the Sheynblat patent. The output signals of the SPFs are various processed signals $DDn_{ij}(t;t0)$ (n=1, 2, 3, 4, 5, 6, 7, 8 and 9) that have different statistical interpretations, as discussed in the Sheynblat patent. The processed signal $DD4_{ij}(t;t0)$ contains an estimate of the multipath contribution, which can be subtracted from the original signals to produce signals with reduced (or eliminated) multipath contributions. The Sheynblat approach is useful where the receiving station is stationary or is moving at a low velocity, say $v \leq v1$, where v1 may lie in the range 0–5 meters per second. The invention disclosed here is not limited to use of the approach disclosed in the Sheynblat patent. Any other suitable approach, collectively called the "low velocity approach" for convenient reference, for low-velocity or zero-velocity determination of the multipath contribution can be used here.

For illustrative purposes, the direct signal is represented by a signal $S_d(t;v)=A \sin(\omega t)$ and the multipath signal contribution is represented by a signal $S_m(t)=A \alpha \sin(\omega(t-T))=A \alpha \sin(\omega t-\phi)$, where $\alpha$ is a real number with magnitude usually less than 1 and $\phi = \omega T$ (mod $2\pi$). The composite signal $S_c(t)$ that arrives at the user's LD signal antenna then becomes $$S_c(t;v) = A \sin(\omega t) + A \alpha \sin(\omega t - \phi) \quad (7)$$
$$= A1 \sin(\omega t - \psi),$$

$$\psi = \tan^{-1}\{\alpha \sin \phi / (1 + \alpha \cos \phi)\} \quad (8)$$

$$A1 = A\{1 + 2 \alpha \cos \phi + \alpha_2\}^{1/2}, \quad (9)$$

Figure 1:
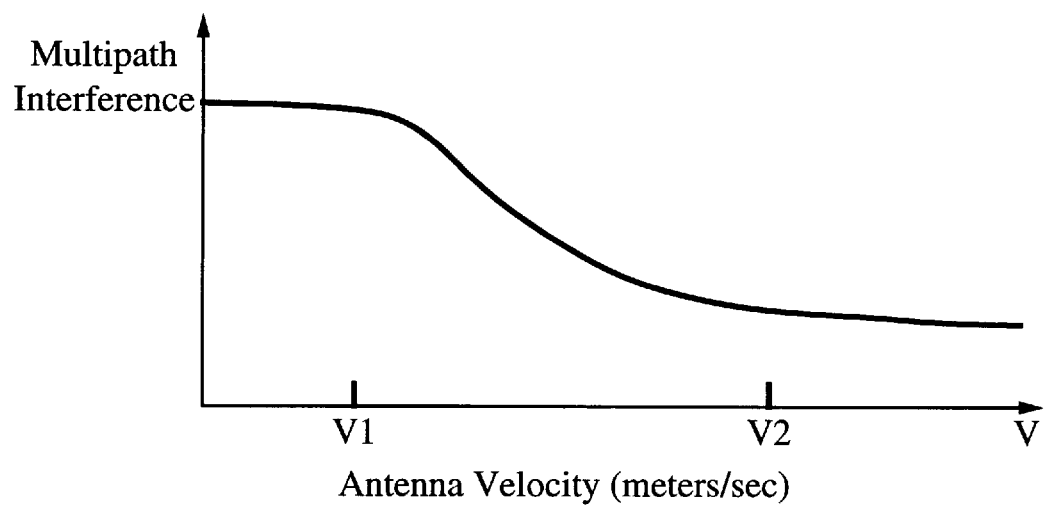
FIG. 1 is a graph qualitatively illustrating the contribution of a multipath signal in a composite signal, where the antenna for the signal receiver is motionless (v=0) and is moving at various speeds (v>0).
Figure 3:
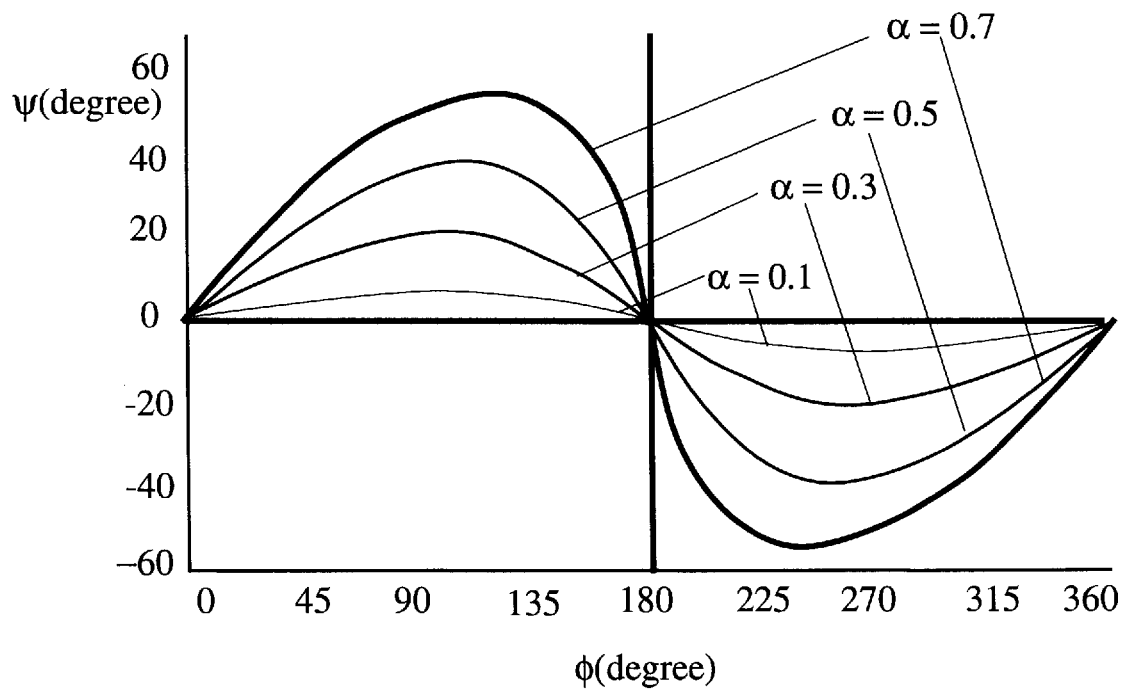
FIG. 3 is a graphical view of a multipath signal-induced phase shift discussed in the text.

FIG. 3 shows the variation of $\psi$ as a function of $\phi$ for various values of $\alpha$. If the multipath signal contribution $S_m(t;v)$ is expressed as a finite or infinite sum of terms, such as $$S_m(t;v) = A \sum_n \alpha_n \sin(\omega t - \phi_n), \quad (10)$$

Eqs. (7) and (8) are replaced by the relations $$S_c(t;v) = A \left\{ 1 + 2 \sum_n \alpha_n \cos\phi_n + \left( \sum_n \alpha_n \cos\phi_n \right)^2 + \left( \sum_n \alpha_n \sin\phi_n \right)^2 \right\}^{1/2} \sin(\omega t - \Phi) \quad (11)$$

$$\Phi = \tan^{-1} \left\{ \sum_n \alpha_n \sin\phi_n / \left( 1 + \sum_n \alpha_n \cos\phi_n \right) \right\}. \quad (12)$$

For this illustration, Eq. (7) will be used. However, Eq. (10) could also be used here for the multipath components. FIG. 3 illustrates the variation of the phase angle shift $\psi$ with the value of the phase angle $\phi$, for various values of the gain factor $\alpha$.

A code loop or carrier loop forms the product of the incoming LD composite signal and an internally generated reference signal $\sin(\omega t - \chi)$ and, in effect, integrates over an integer multiple (J) of the time interval length $\Delta t = 2\pi/\omega$. to produce a loop output signal $$LS = \int_0^{2\pi/\omega} S_c(t;v)\sin(\omega t - \chi)dt(\omega/2\pi J) \quad (13)$$
$$= 0.5 A1 \cos(\chi - \psi).$$

The values of $\psi$, $\alpha$ and $\phi$ can be estimated from a sequence of measurements of the loop output signal LS, using Eqs. (8), (9) and (13). As the multipath phase angle $\phi$ changes, the composite phase angle $\psi$ also changes according to Eq. (8) (see FIG. 3), and the loop output signal LS will vary approximately sinusoidally for fixed loop phase angle $\chi$. If the LD signal antenna 13 is moving during a time averaging interval, $t1 \leq t \leq t1+\Delta t$, the multipath phase angle $\phi$ and the composite phase angle $\psi$ also vary so that a weighted partial average over the angle $\phi$ is performed at the same time.

If the vehicle 11, and hence the antenna 13, is moving at a relatively high speed $v \geq v2$, where $v2(>v1)$ is a second selected speed threshold, such as 3–20 meters per second, the antenna location will be displaced by coordinate increments as in Eqs. (1)–(3), at least one of which is relatively large. In this instance, the curve or locus of sampled location points $C(t) = \{(x(t'), y(t'), z(t')) | t0 \leq t' \leq t\}$ begins at an initial location $(x_0, y_0, z_0)$ and is approximated by a curve with a sequence of coordinates, such as $$x(t_n) = x_0 + \sum_{n'=1}^{n} (v_x(t_{n'-1}) + v_x(t_{n'}))\Delta t_{n'}/2, \quad (14)$$

$$y(t_n) = y_0 + \sum_{n'=1}^{n} (v_y(t_{n'-1}) + v_y(t_{n'}))\Delta t_{n'}/2, \quad (15)$$

$$z(t_n) = z_0 + \sum_{n'=1}^{n} (v_z(t_{n'-1}) + v_z(t_{n'}))\Delta t_{n'}/2, \quad (16)$$

$$\Delta t_{n'} = t_{n'} - t_{n'-1}. \quad (17)$$

$$\Delta t_{n'} = t_{n'} - t_{n'-1} \quad (17)$$

The curve $C(t)$ will move through a region of large physical extent in at least one coordinate direction, and the multipath signal $S_m(t';v)$ ($t0 \leq t' \leq t0+\Delta t_{fix}$) will contain multipath contributions from a dense collection of points or locations along the curve $C(t)$, as illustrated in FIG. 2. Because these multipath contributions vary randomly in location, with approximately zero mean in space, the effect of this spatial averaging is to substantially reduce the net multipath contribution to the LD signal(s) received from LD signal source j at the receiver/processor 15 along the curve C. For $v \geq v2$, the multipath contribution is sufficiently reduced by the effective averaging that no special multipath procedure is performed at such vehicle speeds; this may be characterized as a "no action" approach. With this approach, the range or pseudorange of the antenna 13 relative to the transmitting satellite j is computed ignoring the possible presence of multipath signals in the LD signal received at the antenna. Alternatively, any other suitable approach, collectively referred to as the "high velocity approach" for convenient reference, can be used where the mobile station velocity exceeds the velocity threshold v2.

If the vehicle 11, and hence the antenna 13, moves at a varying or fixed speed $v=v(t)$ in the range $v1<v<v2$, determination of the antenna range or pseudorange in the presence of multipath is a blend of the range or pseudorange produced by low velocity approach and the range or pseudorange produced by the high velocity approach. A suitable velocity-dependent blend here uses a monotonically increasing blend function $f(t;v;j)$ of the velocity v that satisfies the constraints $$f(t;v \leq v1;j)=0, \quad (18)$$

$$f(t;v \geq v2;j)=1, \quad (19)$$

whether velocity is increasing, decreasing or remaining constant. One suitable blend function is $$f1(t;v;j) = 0 \quad (v \leq v1) \quad (20)$$
$$= [(v-v1)/(v2-v1)]^A \quad (v1 < v < v2)$$
$$= 1 \quad (v \geq v2),$$

where A is a selected positive constant. For arbitrary antenna speed v, the present value of the range or pseudorange from LD signal source no. j (17-x, with x=A, B, C, D) to the antenna 13 at a time t is taken to be $$\text{range}(t) = [1-f1(t;v;j)] \text{range}(t; \text{low velocity approach}) + f1(t;v;j) \text{range}(t; \text{high velocity approach}), \quad (21)$$

for any suitable blend function satisfying Eqs. (18) and (19).

As an alternative, the blend function $$f2(t;v;j) = 0 \quad (v \geq v2) \quad (22)$$
$$= [(v2-v)/(v2-v1)]^A \quad (v1 < v < v2)$$
$$= 1 \quad (v \leq v1)$$

is monotonically decreasing with the speed variable v and satisfies $$f2(t;v \leq v1;j)=1 \quad (23)$$

$$f2(t;v \geq v2;j)=0. \quad (24)$$

The appropriate range function for the blend function $f2(t;v;j)$ is $$\text{range}(t)=f2(t;v;j) \text{range}(t; \text{low velocity approach})+[1-f2(t;v;j)] \text{range}(t; \text{high velocity approach}). \quad (25)$$

In a second embodiment of the invention, a blend function $g(t-t_{thr};\tau;j)$ is used that varies with the time $\Delta t=t-t_{thr}$ elapsed since the time, $t'=t_{thr}$, that the "entrant" velocity threshold ($v=v1$ with $dv/dt >0$, or $v=v2$ with $dv/dt <0$) was crossed. Here, $\tau$ is a selected positive time value parameter, which is typically in the range 1–10 sec. The blend function $g(\Delta t;\tau,j)$ is monotonically increasing with the variable $\Delta t$ and satisfies $$g(\Delta t=0;\tau;j)=0 \quad (26)$$

$$g(\Delta t \geq \tau,\tau;j)=1, \quad (27)$$

and the present value of the range from the LD signal source to the antenna 13 at a time t is taken to be $$\text{range}(t)=[1-g(t-t_{thr};\tau;j)] \text{range}(t; \text{low velocity approach})+g(t-t_{thr};\tau;j)\text{range}(t; \text{high velocity approach}). \quad (28)$$

One suitable blend function that depends upon elapsed time $\Delta t=t-t_{thr}$ after v crosses the threshold $v=v1$ with $dv/dt >0$ is $$g1(t;v;j) = 0 \quad (t \leq t_{thr}) \quad (29)$$
$$= (t-t_{thr})^C/\tau^C \quad (t_{thr} < t < t_{thr}+\tau)$$
$$= 1 \quad (t > t_{thr}+\tau),$$

where $\tau$ is a selected time value parameter, C is a selected positive constant, $t=t_{thr}$ indicates the time the velocity $v(t)$ attains a value v1 with $dv/dt >0$, and one or more of the parameters $\tau$, C and $t_{thr}$ may depend upon the LD signal source index J.

Another suitable blend function that behaves analogously to the blend function g1 is $$g2(t;v;j) = 0 \quad (t \leq t_{thr}) \quad (30)$$
$$= D\{1 - \exp(-E(t - t_{thr}))\} \quad (t_{thr} < t < t_{thr} + \tau)$$
$$= 1 \quad (t > t_{thr} + \tau),$$

where E is a selected positive constant, D satisfies $0<D\leq 1$, $t_{thr}$ indicates the time the velocity v(t) attains a value v1 with dv/dt>0, and one or more of the parameters D, E and $t_{thr}$ may depend upon the LD signal source index j.

One suitable blend function that depends upon elapsed time $\Delta t = t - t_{thr}$ after v crosses the threshold v=v2 with dv/dt<0 is $$g3(t;v;j) = 1 \quad (t \leq t_{thr}) \quad (31)$$
$$= (\tau - (t - t_{thr}))^C / \tau^C \quad (t_{thr} < t < t_{thr} + \tau)$$
$$= 0 \quad (t > t_{thr} + \tau),$$

where $\tau$ is a selected time value parameter, C is a selected positive constant, $t_{thr}$ indicates the time the velocity v(t) attains a value v2 with dv/dt<0, and one or more of the parameters $\tau$, C and $t_{thr}$ may depend upon the LD signal source index j.

Another suitable blend function that behaves analogously to the blend function g3 is $$g4(t;v;j) = 1 \quad (t \leq t_{thr}) \quad (32)$$
$$= D\{1 - \exp(-E(\tau + t_{thr} - t))\} \quad (t_{thr} < t < t_{thr} + \tau)$$
$$= 0 \quad (t > t_{thr} + \tau),$$

where E is a selected positive constant, D satisfies $0<D\leq 1$, $t_{thr}$ indicates the time the velocity v(t) attains a value v2 with dv/dt<0, and one or more of the parameters D, E and $t_{thr}$ may depend upon the LD signal source index j.

In this second embodiment, the time value parameter $\tau$ may depend upon, and vary inversely with, the measured acceleration or time rate of change of velocity, a=dv/dt, at the time the velocity threshold is passed, for example, as $$\tau = (v2 - v1)/(F + dv/dt), \quad (33)$$

where F is a selected non-negative constant.

In a third embodiment of the invention, a blend function h($\Delta$t; v; dv/dt;j) is used that depends generally upon elapsed time $\Delta$t, velocity v(t), the time a velocity threshold (v=v1 or v=v2) is crossed, and upon whether the acceleration a=dv/dt is positive or negative. The present value of the range from the LD signal source to the antenna 13 at a time t is taken to be $$\text{range}(t) = [1 - h(t;v;dv/dt;j)] \text{ range}(t; \text{ low velocity approach}) + \\ h(t;v;dv/dt;j) \text{ range}(t; \text{ high velocity approach}). \quad (34)$$

The mobile station velocity v(t) and the "entrant" time rate of change of velocity, dv/dt, can be determined using the LD signals or using some other location or velocity determination system, such as inertial navigation, accelerometers or local magnetic field sensing.

Figure 4:
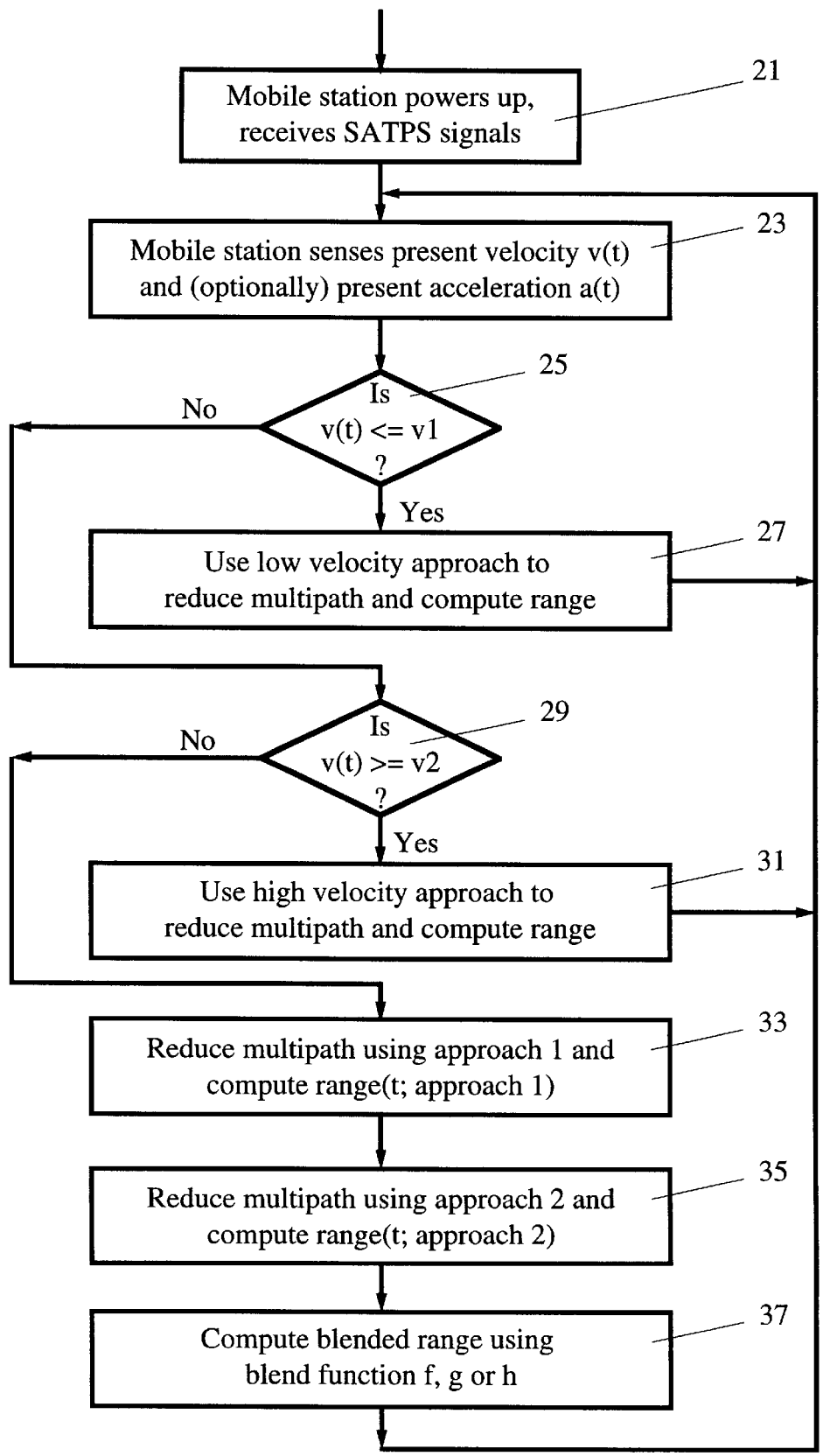
FIG. 4 is a flow chart illustrating the procedure to be followed in one embodiment of the invention.

FIG. 4 is a flow chart illustrating a procedure for practice of one embodiment of the invention, using the blend function f(t;v(t);j), g(t;v(t),j) or h(t;v;dv/dt;j) as an example. In step 21, the mobile LD station 12 is powered up, acquires the LD signals, and begins receiving composite LD signals that may include multipath contributions. In step 23, the mobile station senses its present velocity v(t), and, optionally, its present acceleration a(t)=dv/dt. In step 25, the mobile station compares v(t) with the first threshold v1. If v(t) $\leq$v1, the mobile station uses a low velocity approach for reduction of the multipath contribution to the composite LD signal and determination of the range, as in step 27, and recycles to step 23. If v(t) is greater than v1, the mobile station compares v(t) with the second threshold v2, in step 29. If v$\geq$v2, the mobile station uses a high velocity approach for reduction of the multipath contribution to the composite LD signal and determination of the range, as in step 31, and recycles to step 23. If v1<v(t <v2, the mobile station (1) computes the range using the low velocity approach to reduce the multipath contribution, in step 33, (2) computes the range using the high velocity approach to reduce the multipath contribution, in step 35, (3) computes the blended range value using the appropriate blend function, f(t;v;j) or g($\Delta$t;$\tau$;j) or h(t;v;dv/dt;j), in step 37, and (4) recycles to step 23.

I claim:

1. A method of suppressing the effects of multipath signals in determination of the location of a mobile user, the method comprising the steps of:

determining the location of a location determination (LD) unit, that is transported with a mobile user, that receives and processes LD signals from a plurality of LD signal sources numbered j=1, 2, . . . , J (J$\geq$2), and that determines the location coordinates x(t)=(x(t), y(t), z(t)) and the speed or magnitude v(t)=|v(t)| of the velocity vector v(t) of the LD unit as a function of time t, using a measured range $\rho$(t;j) from the LD unit to each of the LD signal sources;

where the speed v of the LD unit is no greater than a first selected velocity threshold v1, determining the ranges $\rho=\rho 1(t;j)$ (j=1, 2, . . . , J) by a first method that reduces the effects of presence of multipath signals in the LD signals received by anantenna of the LD unit;

where the speed v of the LD unit is no less than a second selected velocity threshold v2 (>v1), determining the ranges $\rho=\rho 2(t;j)$ (j=1, 2, . . . , J) by a second method that reduces the effects of presence of multipath signals in the LD signals received by the antenna; and determining a blended range $\rho$(t,j;blend) that equals $\rho 1$(t;j) when v(t)$\leq$v1, that equals $\rho 2$(t;j) when v(t)$\geq$v2, and that varies continuously from $\rho 1$(t;j) to $\rho 2$(t;j) for speeds v(t) satisfying v1<v(t)<v2.

2. The method of claim 1, wherein said step of determining said blended range $\rho$(t;j;blend) comprises the steps of:

selecting monotonically increasing functions f(t;v;dv/dt;j), which may depend upon the variable t, the variable v=v(t) and the variable dv/dt, that satisfy $$f(t;v;dv/dt;j) = 0 \ (v(t) \leq v1)$$
$$= 1 \ (v(t) \geq v2); \text{ and}$$

determining said blended range $\rho$(t;j;blend) (j=1, 2, . . . , J) by the relation $$\rho(t;j;\text{blend}) = [1 - f(t;v;dv/dt;j)]\rho 1(t;j) + f(t;v;dv/dt;j) \rho 2(t;j).$$

3. The method of claim 2, further comprising the step of selecting at least two of said monotonically increasing functions f(t;v;dv/dt;j) to be equal for different values of j.

4. The method of claim 2, further comprising the step of choosing at least one of said selected functions f to be the function defined by $$f(t;v;dv/dt;j) = 0 \quad (v \leq v1)$$
$$= [(v(t) - v1)/(v2 - v1)]^A \quad (v1 < v < v2)$$
$$= 1 \quad (v \geq v2),$$

where A is a selected positive constant that may depend upon the index j.

5. The method of claim 2, further comprising the step of choosing at least one of said selected functions f to be the function defined by $$f(t;v;dv/dt;j) = 0 \quad (t \leq t_{thr})$$
$$= (t - t_{thr})^C/\tau^C \quad (t_{thr} < t < t_{thr} + \tau)$$
$$= 1 \quad (t > t_{thr} + \tau),$$

where $\tau$ is a selected time value parameter, C is a selected positive constant, $t=t_{thr}$ indicates the time the velocity v(t) attains a value v1 with dv/dt >0, and one or more of the parameters $\tau$, C and $t_{thr}$ may depend upon the index j.

6. The method of claim 2, further comprising the step of choosing at least one of said selected functions f to be the function defined by $$f(t;v;dv/dt;j) = 0 \quad (t \leq t_{thr})$$
$$= D\{1 - \exp(-E(t - t_{thr}))\} \quad (t_{thr} < t < t_{thr} + \tau)$$
$$= 1 \quad (t > t_{thr} + \tau),$$

where E is a selected positive constant, D satisfies 0<D≦1, $t_{thr}$ indicates the time the velocity v(t) attains a value v1 with dv/dt >0, and one or more of the parameters D, E and $t_{thr}$ may depend upon the index j.

7. The method of claim 1, wherein said step of determining said blended range ρ(t;j;blend) comprises the steps of:

selecting monotonically decreasing functions f(t;v;dv/dt;j), which may depend upon the variable t, the variable v=v(t) and the variable dv/dt, that satisfy $$f(t;v;dv/dt;j) = 1 \quad (v(t) \leq v1)$$
$$= 0 \quad (v(t) \geq v2); \text{ and}$$

determining said blended range ρ(t;j;blend) (j=1, 2, . . . , J) by the relation

ρ(t;j;blend)=f(t;v;dv/dt;j) ρ1(t;j) +[1−f(t;v;dv/dt;j)]ρ2(t;j).

8. The method of claim 7, further comprising the step of selecting at least two of said monotonically decreasing functions f(t;v;dv/dt;j) to be equal for different values of j.

9. The method of claim 7, further comprising the step of choosing at least one of said selected functions f to be the function defined by $$f(t;v;dv/dt;j) = 1 \quad (v \leq v1)$$
$$= [(v2 - v(t))/(v2 - v1)]^A \quad (v1 < v < v2)$$
$$= 0 \quad (v \geq v2),$$

where A is a selected positive constant that may depend upon the index j.

10. The method of claim 7, further comprising the step of choosing at least one of said selected functions f to be the function defined by $$f(t;v;dv/dt;j) = 1 \quad (t \leq t_{thr})$$
$$= (\tau - (t - t_{thr}))^C/\tau^C \quad (t_{thr} < t < t_{thr} + \tau)$$
$$= 0 \quad (t > t_{thr} + \tau),$$

where $\tau$ is a selected time value parameter, C is a selected positive constant, $t_{thr}$ indicates the time the velocity v(t) attains a value v2 with dv/dt <0, and one or more of the parameters $\tau$, C and $t_{thr}$ may depend upon the index j.

11. The method of claim 7, further comprising the step of choosing at least one of said selected functions f to be the function defined by $$f(t;v;dv/dt;j) = 1 \quad (t \leq t_{thr})$$
$$= D\{1 - \exp(-E(\tau + t_{thr} - t))\} \quad (t_{thr} < t < t_{thr} + \tau)$$
$$= 0 \quad (t > t_{thr} + \tau),$$

where E is a selected positive constant, D satisfies 0<D≦1, $t_{thr}$ indicates the time the velocity v(t) attains a value v2 with dv/dt<0, and one or more of the parameters D, E and $t_{thr}$ may depend upon the index j.

12. The method of claim 1, further comprising the step of causing a LD signal receiver/processor to determine the location coordinates (x(t), y(t), z(t)) of said user, using a blended range value of ρ(t;j;blend).

13. The method of claim 1, further comprising the step of selecting said LD signals that are received and processed from the class of signals consisting of GPS signals, GLONASS signals, LORAN signals, TACAN signals, Omega signals, Decca signals, JTIDS Relnav signals, PLRS signals and FM subcarrier signals.

14. Apparatus for suppressing the effects of multipath signals in determination of the location of a mobile user, the apparatus comprising:

a location determination (LD) unit, including a microprocessor, that is transported with a mobile user, that receives and processes LD signals from a plurality of LD signal sources numbered j=1, 2, . . . , J (J≧2), and that determines the location coordinates x(t)=(x(t), y(t), z(t)) and the speed or magnitude v(t)=|v(t)| of the velocity vector v(t) of the LD unit as a function of time t, using a measured range ρ(t;j) from the LD unit to each of the LD signal sources, where the microprocessor is programmed so that:

where the speed v of the LD unit is no greater than a first selected velocity threshold v1, the microprocessor determines the ranges ρ=ρ1(t;j) (j=1, 2, . . . , J) by a first method that reduces the effects of presence of multipath signals in the LD signals received by an antenna of the LD unit;

where the speed v of the LD unit is no less than a second selected velocity threshold v2(>v1), the microprocessor determines the ranges ρ=ρ2(t;j) (j=1, 2, . . . , J) by a second method that reduces the effects of presence of multipath signals in the LD signals received by the antenna; and where the speed v of the LD unit satisfies v1<v(t)<v2, the microprocessor determines a blended range ρ(t;j;blend) that equals ρ1(t;j) when v(t)≦v1, that equals ρ2(t;j) when v(t)≧v2, and that varies continuously from ρ1(t;j) to ρ2(t;j) for speeds v(t) satisfying v1<v(t)<v2.

15. The apparatus of claim 14, wherein said microprocessor determines said blended range ρ(t;j;blend) by (1) using selected monotonically increasing functions f(t;v;dv/dt,j), which may depend upon the variable t, the variable $v=v(t)$ and the variable $dv/dt$, that satisfy $$f(t;v;dv/dt;j) = 0 \quad (v(t) \leq v1)$$
$$= 1 \quad (v(t) \geq v2)$$

and (2) determining said blended range $\rho(t;j;\text{blend})$ (j=1, 2, ..., J) by the relation $$\rho(t,j;\text{blend})=[1-f(t;v;dv/dt,j)]\rho1\ (t;j) +f(t;v;dv/dt;j)\ \rho2(t;j).$$

16. The apparatus of claim 15, wherein at least two of said selected monotonically increasing functions f(t;v;dv/dt;j) are equal for different values of j.

17. The apparatus of claim 14, wherein said microprocessor determines said blended range $\rho(t;j;\text{blend})$ by (1) using selected monotonically decreasing functions f(t;v(t);dv/dt;j), which may depend upon the variable t, the variable $v=v(t)$ and the variable $dv/dt$, that satisfy $$f(t;v;dv/dt;j) = 1 \quad (v(t) \leq v1)$$
$$= 0 \quad (v(t) \geq v2)$$

and (2) determining said blended range $\rho(t;j;\text{blend})$ (j=1, 2, ..., J) by the relation $$\rho(t;j;\text{blend})=f(t;v;dv/dt;j)\rho1(t;j) +[1-f(t;v;dv/dt;j)]\rho2(t;j).$$

18. The apparatus of claim 17, wherein at least two of said selected monotonically decreasing functions f(t;v;dv/dt;j) are equal for different values of j.

19. The apparatus of claim 14, wherein said LD signals that are received and processed are drawn from the class of signals consisting of GPS signals, GLONASS signals, LORAN signals, TACAN signals, Omega signals, Decca signals, JTIDS Relnav signals, PLRS signals and FM subcarrier signals.

* * * * *